US 8,068,417 B1

(12) United States Patent
Roberts

(10) Patent No.: US 8,068,417 B1
(45) Date of Patent: Nov. 29, 2011

(54) SYSTEM, METHOD, AND COMPUTER PROGRAM PRODUCT FOR PROCESSING FLOW REQUESTS BASED ON AN ASSOCIATED PREFERENCE USING A SINGLE COMPUTATION

(75) Inventor: Lawrence G. Roberts, Woodside, CA (US)

(73) Assignee: Anagran, Inc., Sunnyvale, CA (US)

( * ) Notice: Subject to any disclaimer, the term of this patent is extended or adjusted under 35 U.S.C. 154(b) by 295 days.

(21) Appl. No.: 11/871,647

(22) Filed: Oct. 12, 2007

Related U.S. Application Data

(60) Provisional application No. 60/829,265, filed on Oct. 12, 2006.

(51) Int. Cl.
*H04L 12/26* (2006.01)

(52) U.S. Cl. .................................. 370/230; 370/395.21
(58) Field of Classification Search .................. 370/230, 370/395.21
See application file for complete search history.

(56) References Cited

U.S. PATENT DOCUMENTS

| 5,946,324 | A | * | 8/1999 | Mishra et al. | 370/468 |
| 6,885,637 | B1 | * | 4/2005 | Shvodian | 370/229 |
| 2003/0233472 | A1 | * | 12/2003 | Tundlam et al. | 709/238 |

* cited by examiner

*Primary Examiner* — Huy Vu
*Assistant Examiner* — Benjamin Lamont
(74) *Attorney, Agent, or Firm* — Zilka-Kotab, PC

(57) ABSTRACT

A router system, method and computer program product are provided. In use, a flow request is received. In addition, the flow request is processed based on one of a plurality of preferences using a single measurement and/or a single computation. Further, the one preference is associated with the flow request.

11 Claims, 4 Drawing Sheets

SYSTEM, METHOD, AND COMPUTER PROGRAM PRODUCT FOR PROCESSING FLOW REQUESTS BASED ON AN ASSOCIATED PREFERENCE USING A SINGLE COMPUTATION

RELATED APPLICATIONS

This application claims the benefit of U.S. Provisional Application No. 60/829,265 filed on Oct. 12, 2006, the disclosure of which is incorporated herein by reference.

BACKGROUND AND FIELD OF THE INVENTION

The present invention relates to routers, and more particularly, to routing flows of packets.

SUMMARY

A router system, method and computer program product are provided. In use, a flow request is received. In addition, the flow request is processed based on one of a plurality of preferences using a single measurement and/or a single computation. Further, the one preference is associated with the flow request.

DETAILED DESCRIPTION

Figure 1:
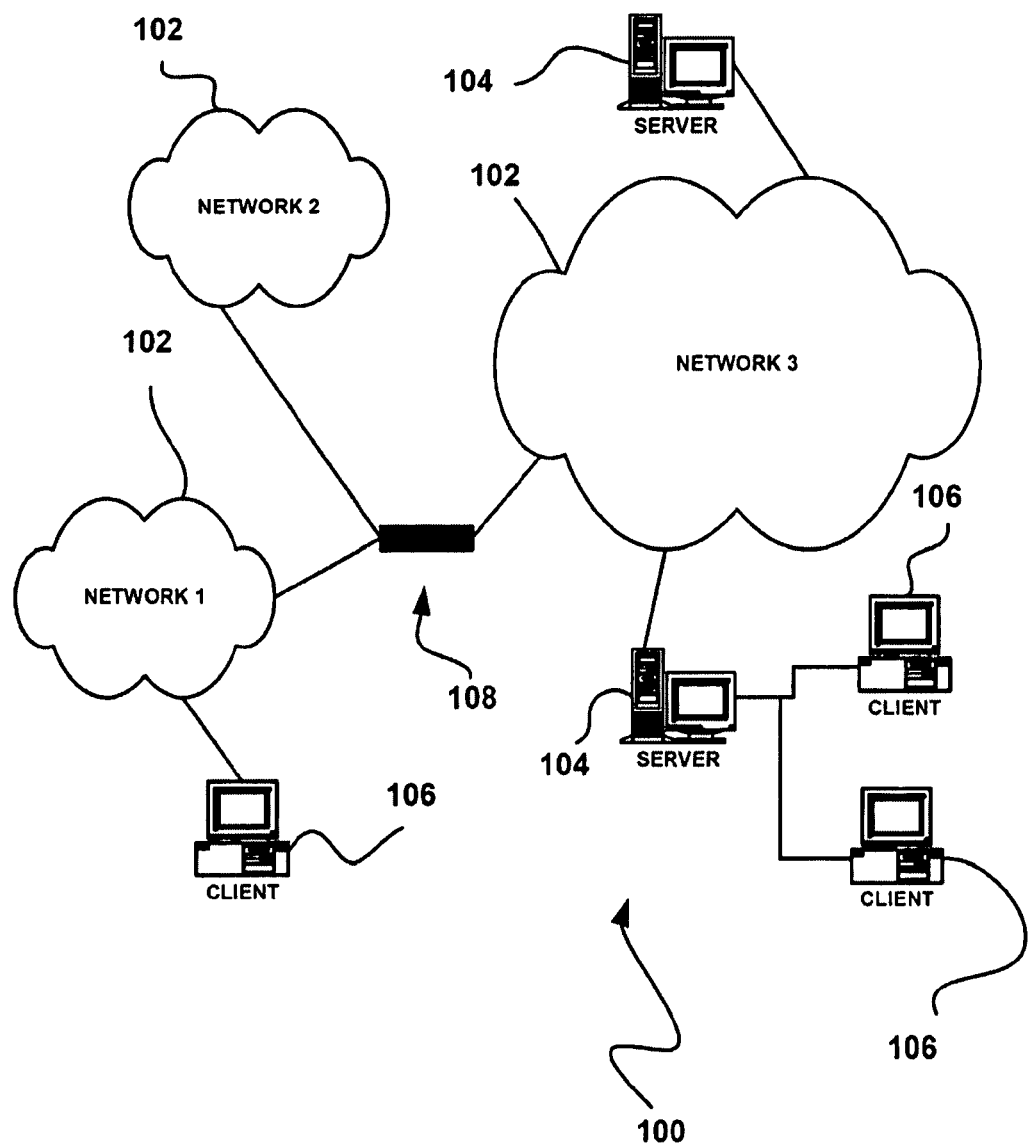
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), wireless network, wide area network (WAN) such as the Internet, etc.

Coupled to the networks 102 are server computers 104 which are capable of communicating over the networks 102. Also coupled to the networks 102 and the server computers 104 is a plurality of client computers 106. Such client computers 106 may each include a desktop computer, lap-top computer, hand-held computer, mobile phone, hand-held computer, personal video recorder (PVR), a digital media [e.g. compact disc (CD), digital video disc (DVD), MP3, etc.] player, printer, and/or any other type of logic.

In order to facilitate communication among the networks 102, at least one router 108 is coupled between the networks 102. In the context of the present description, such router 108 may include any hardware and/or software capable of facilitating the communication of packets from one point in the network architecture 100 to another. More information regarding various features for enhancing such functionality will be set forth hereinafter in greater detail.

Figure 2:
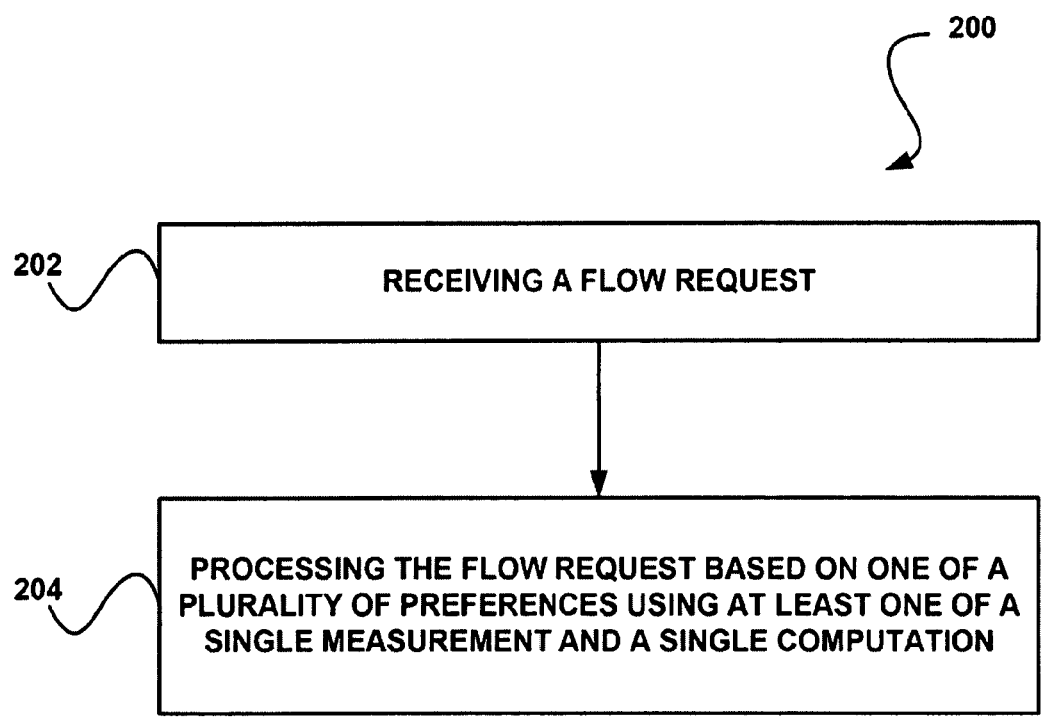
FIG. 2 shows a method for processing flow requests using at least one of a single measurement and a single computation, in accordance with one embodiment.

FIG. 2 shows a method 200 for processing flow requests using a single measurement and/or a single computation, in accordance with one embodiment. As an option, the present method 200 may be implemented in the context of the architecture and environment of FIG. 1. Of course, however, the method 200 may be carried out in any desired environment.

As shown in operation 202, a flow request is received. The flow request may include any request to communicate data. For example, the flow request may include a request to transmit data over a network. Optionally, the data may include packets, but, of course, may include any data or portion thereof. Still yet, such flow request may be associated with any desired type of protocol [e.g. Transmission Control Protocol (TCP), user datagram protocol (UDP), etc.].

In one embodiment, the flow request may be associated with a fixed rate (FR) flow. Such FR flow may include a streaming media flow (e.g. voice application flow, video flow, etc.), for example. Of course, however, the FR flow may include any real time flow that requires a specific rate. In addition, the FR flow may be associated with a class (e.g. fixed flow rate class, etc.), the capacity for which may be user-configured. The class may therefore limit the amount of flows capable of being processed at one time.

In another embodiment, the flow request may be associated with an available rate (AR) flow. The AR flow may include any flow for which a flow rate is determined by the network based on available capacity. For example, a plurality of classes of network traffic may each be associated with a different flow rate, such that an AR flow may be associated with a class based on an available flow rate. In this way, AR flows of the same class may be associated with the same flow rate.

In yet another embodiment, the flow request may be associated with a variable rate (VR) flow. The VR flow may include a flow that may be associated with a plurality of different flow rates. For example, the VR flow may be associated with a FR flow in part and an AR flow in part. Of course, the foregoing rate flows are set forth for illustrative purposes only, since any rate flow may be employed.

In one optional embodiment, the flow request may be received at a router. The router may include, for example, the router described above with respect to FIG. 1. Accordingly, in one embodiment, the flow request may include a request for the router to transmit data via a port of the router.

The flow request is then processed using at least one of a single measurement and a single computation based on a preference, as shown in operation 204. The flow request may be processed by the router, for example. Optionally, the flow request may be processed utilizing a port of the router. In one option with respect to AR flows, the flow request may be processed to determine a flow rate associated with the flow request. As another option with respect to FR flows, the flow request may be processed by determining whether to accept and/or reject the flow request (e.g. whether to transmit data associated with the flow request, etc.).

In the context of the present description, the preference may be derived from anything (e.g. data, etc.) that is capable of being used for determining which flow requests are processed foremost. Further, the preference may be derived from signaling associated with the flow. Thus, in one embodiment, the preference may identify a priority for the flow request. In another embodiment, the preference may be used to determine if the flow should be accepted. More information on processing flow requests utilizing such a preference will be described in more detail with respect to FIG. 3.

In another embodiment, the preference may be associated with a preference weight. The preference weight may then be utilized to calculate a rate for the flow from a weighted fraction of total flow capacity. More information on processing flow requests utilizing such a preference will be described in more detail with respect to FIG. 4.

Still yet, the single computation that may be utilized to calculate the preference may include any type of computation. For example, the computation may include a mathematical computation, rule-based computation, logical computation, etc. Moreover, the single measurement that may be utilized may include any desired measurement capable of being utilized to process the flow request. For example, the single measurement may include an average number of bytes for a port of a router, etc.

In addition, the single computation may optionally utilize a single measurement and/or only two measurements, as will be discussed in more detail with respect to FIGS. 3 and 4. In this way, flow requests may, in some optional embodiments, be processed utilizing minimal computer memory (e.g. without necessarily requiring a queue for each preference level, etc.) and minimal computationally complex decisions (e.g. without necessarily having to measure a load for each preference level, etc.), regardless of the number of preferences (e.g. 64 preferences, etc.) capable of being utilized to process received flow requests. Thus, any one of such preferences may be selected for each flow request while limiting computer memory consumption and computationally complex decisions.

For example, if a flow request is unable to be processed without overflowing an available capacity of a traffic class associated with the flow, then determining preferences of the flow request and all existing flows in the class along with an actual used capacity of each available preference may possibly be prevented. Thus, in one embodiment, an efficient method of processing flow requests may be provided.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
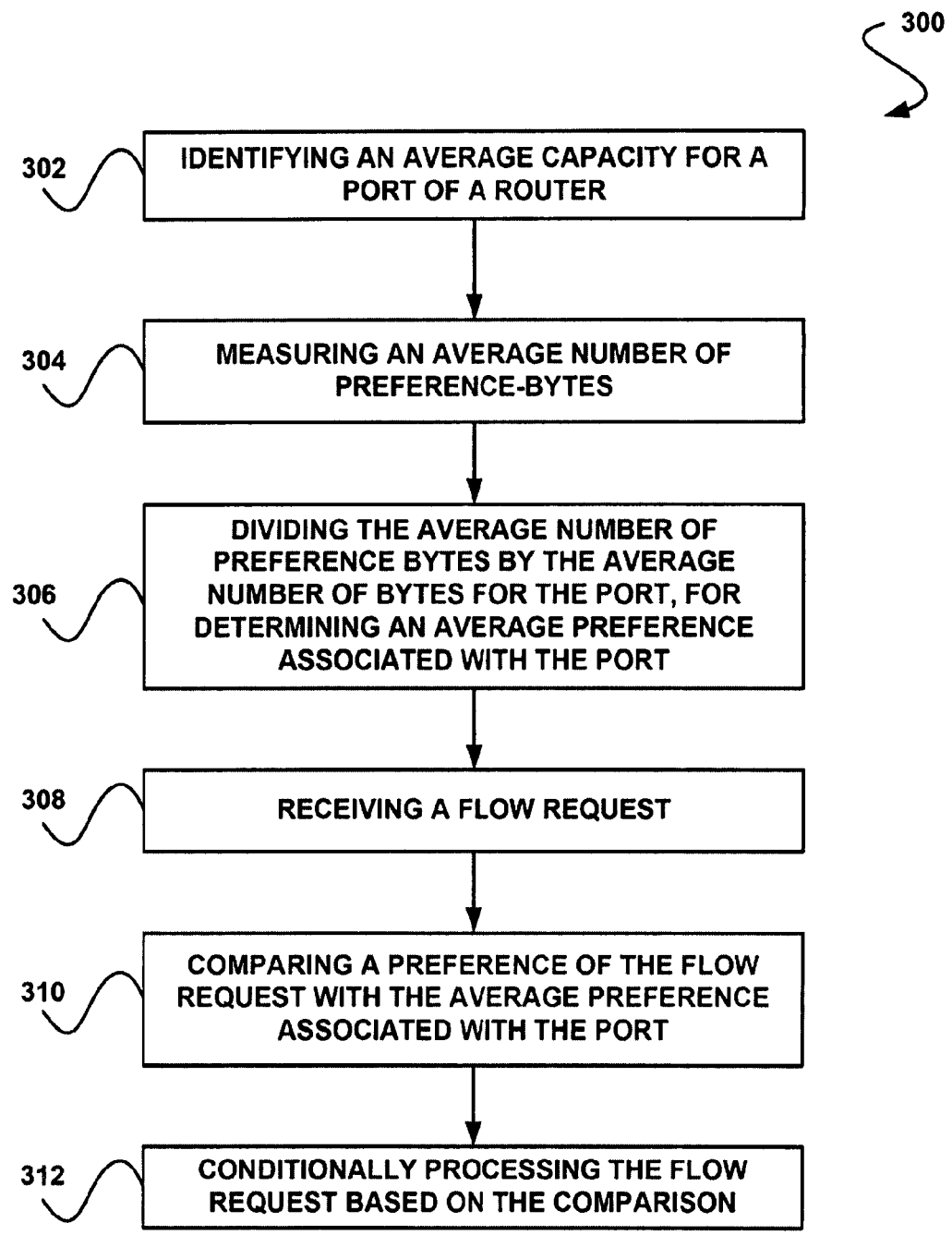
FIG. 3 shows a method for processing flow requests using only two measurements and a single computation, in accordance with another embodiment.

FIG. 3 shows a method 300 for processing flow requests using only two measurements and a single computation, in accordance with another embodiment. As an option, the present system 300 may be implemented in the context of the architecture and environment of FIGS. 1-2. Of course, however, the system 300 may be carried out in any desired environment. Further, the foregoing definitions may equally apply in the present description.

As shown in operation 302, an average capacity for a port of a router is identified. It should be noted that operation 302 may be optional. The average capacity that is identified may be associated with any desired period of time. In addition, the average capacity may reflect an exponential average of a number of bytes that are transmitted from the port during such period of time.

In one embodiment, the average capacity may be associated with a capacity of a class (e.g. fixed rate class, etc.) of flows. For example, the average capacity may be identified since FR flows may average less than or more than their peak flow rate. Further, the average capacity may also be associated with a total number of flows in the associated class. In one embodiment, the larger the number of flows in the class, the closer the average capacity may be to the maximum capacity of the port.

Also, an average number of preference-bytes is measured that includes an average number of bytes multiplied by a flow preference for a predetermined period, as shown in operation 304. The average number of preference-bytes may include, for example, the average capacity (i.e. the exponential average of the number of bytes that are transmitted from the port during the period of time) multiplied by a flow preference for the time period. The average preference may then be computed by dividing the average preference-bytes by the average bytes traversing the port. Note operation 306.

Also, a flow request may be received, as shown in operation 308. In various embodiments, the flow request may be associated with an FR or UDP flow.

Additionally, a preference of the flow request may be identified. Thus, in one embodiment, a preference requested by the flow request may be identified. Further, the preference of the flow request may be compared with the average preference associated with the port, as shown in operation 310. The flow request may then be conditionally processed based on the comparison, as in operation 312.

For example, if the preference of the flow request is equal to and/or greater than (or in another embodiment only greater than) the average preference associated with the port, then the flow request may be processed (e.g. accepted, etc.). On the other hand, if the preference of the flow is less than (or in another embodiment equal to and/or less than) the average preference associated with the port, then the flow request may not be processed (e.g. rejected, terminated, etc.). Of course, however, it should be noted that the flow request may be conditionally processed in any desired manner that is based on the comparison of operation 310.

In this way, it may be ensured that flow requests associated with high preferences are accepted. Moreover, over time flow requests associated with lower preferences may be rejected, thus correcting the total capacity associated with the particular port. Accordingly, supporting high preference flows in such a manner may therefore protect the network by preventing overload of the network.

Figure 4:
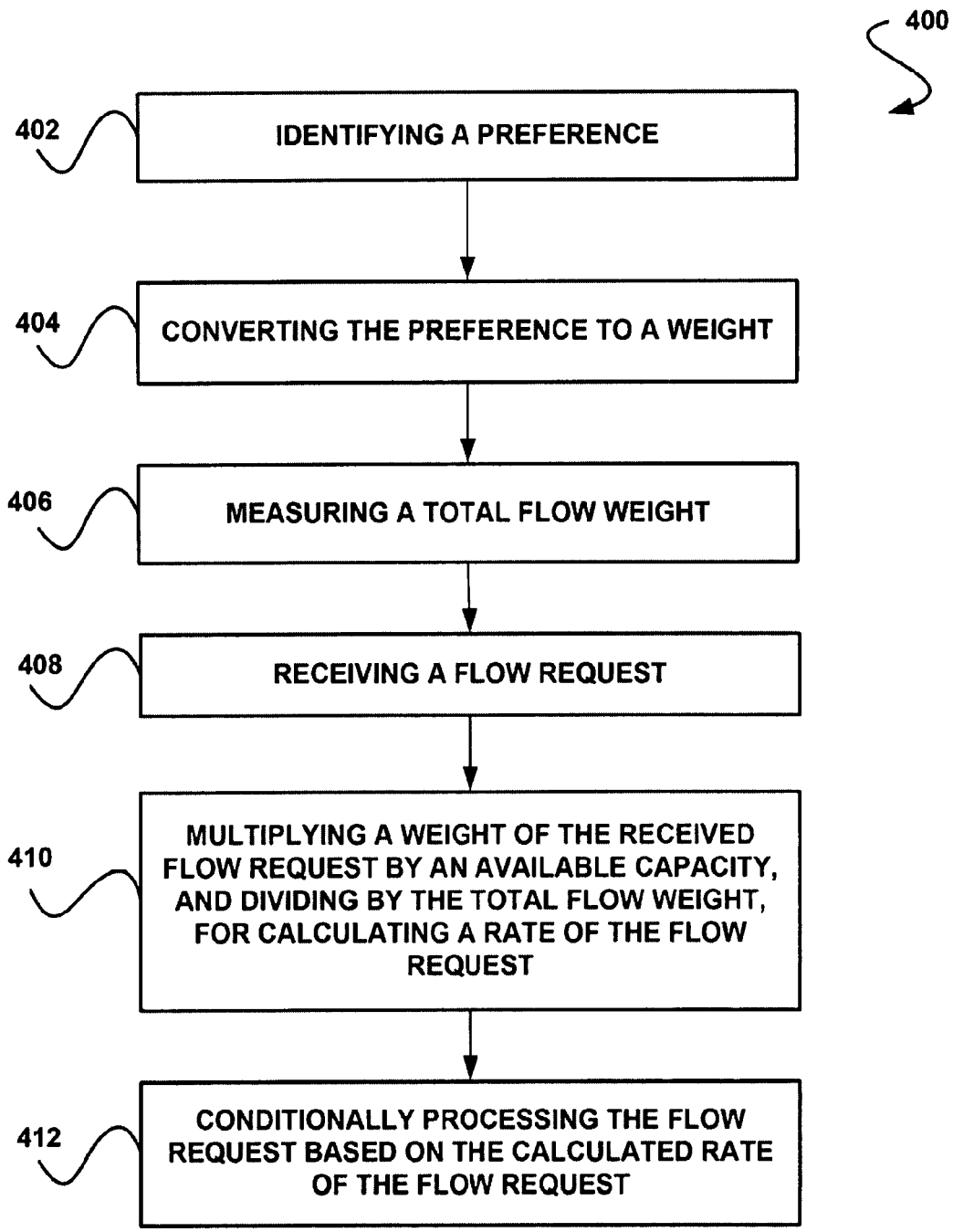
FIG. 4 shows a method for processing flow requests using a single measurement and a single computation, in accordance with yet another embodiment.

FIG. 4 shows a method 400 for processing flow requests using a single measurement and a single computation, in accordance with yet another embodiment. As an option, the method 400 may be implemented in the context of the architecture and environment of FIGS. 1-2. Of course, however, the method 400 may be carried out in any desired environment. Further, the foregoing definitions may equally apply in the present description.

As shown in operation 402, a preference is identified. In one embodiment, the preference may be determined from information in the flow being processed. In another embodiment, the preference may be signaled at the start of the flow.

The preference is then converted to a preference weight, as shown in operation 404. The preference may be converted in any desired manner. For example, the preference may be converted utilizing a function, a lookup table, etc. Thus, a weight may be determined for each for each flow being processed.

In addition, a total flow weight is measured, as shown in operation 406. The total flow weight may include a sum of flow weights associated with flows that are being processed. As shown in operation 408, a flow request is received. In one embodiment, the flow request may be associated with an AR flow. A weight of the flow request may be determined based on the preference or from other information such as the class of service the user has subscribed to.

A rate for the flow is then computed by multiplying the flow weight by a total available capacity, and dividing by the total flow weight (e.g. the sum of all the flow weights). Note operation 410.

Moreover, the flow request is conditionally processed based on the calculated rate of the flow request, as shown in operation 412. For example, flow requests associated with higher preferences may be provided more capacity within an associated class, whereas flow requests associated with lower preferences may be provided less capacity within the associated class. In addition, such flow requests may be prevented from being rejected unless a flow rate associated therewith is less than a predefined flow rate threshold.

In an optional embodiment, preference for a VR flow may be determined as described above (with respect to FIG. 4). However, preference for a minimum guaranteed capacity associated with the VR flow may be processed in the manner described above with respect to FIG. 3. Thus, processing for VR flows may be determined utilizing both of the methods described with respect to FIGS. 3 and 4.

Such combinational processing may be performed where a VR flow contains both a FR flow subpart and an AR flow subpart. For example, if the FR flow subpart would not be processed due to its preference being lower than an average preference, then such portion of the VR flow may not be processed (as described in FIG. 3). Independent of the processing of the FR portion of the flow the AR flow subpart may be conditionally processed based on a calculated preference thereof (as described in FIG. 4).

In this way, flow requests may be processed utilizing only a single computation and a single measurement no matter how many preferences are used. As a result, a large number of preferences may be supported without an amount of memory and computations being increased for each of such preferences utilized. Thus, efficiency in processing flow requests of differing preferences may be provided.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
measuring an average number of preference-bytes associated with an output port of a router for a predetermined period by averaging a series of products each resulting from a number of bytes of a flow multiplied by a flow preference of the flow;
determining an average preference associated with the output port of the router by dividing the average number of preference-bytes by an average number of bytes for the output port of the router for the predetermined period;
receiving a flow request;
comparing a preference of the flow request with the average preference associated with the output port, the preference of the flow request identifying a priority of the flow request with respect to other received flow requests; and
accepting or rejecting the flow request based on the comparison;
wherein the router uses a plurality of preferences of received flow requests to determine whether to accept or reject the received flow requests and the determination of whether to accept or reject each of the received flow requests requires only a single computation and does not require a queue for each of the preferences of received flow requests.

2. The method of claim 1, wherein the flow request is received by the router.

3. The method of claim 1, wherein the preference of the flow request includes a preference requested by the flow request.

4. The method of claim 1, wherein the flow request is accepted if the preference of the flow request is equal to or greater than the average preference associated with the output port.

5. The method of claim 1, wherein the flow request is accepted if the preference of the flow request is greater than the average preference associated with the output port.

6. The method of claim 1, wherein the flow request is rejected if the preference of the flow request is less than the average preference associated with the output port.

7. The method of claim 1, wherein the flow request is rejected if the preference of the flow request is less than or equal to the average preference associated with the output port.

8. The method of claim 1, wherein rejecting the flow request includes terminating the flow request.

9. The method of claim 1, wherein the measurement of the average number of preference-bytes and the determination of the average preference are for a traffic class.

10. The method of claim 1, where exponential averages are used to measure the average preference and the average preference-bytes for the predetermined period.

11. The method of claim 1, wherein the determination of the average preference is applied to only a specific subset of traffic exiting the output port, which is less than all traffic on the output port.

* * * * *